United States Patent [19]

Albrecht et al.

[11] Patent Number: 4,812,963
[45] Date of Patent: Mar. 14, 1989

[54] PLURAL COOKING COMPUTER COMMUNICATION SYSTEM

[75] Inventors: Lance M. Albrecht, Wallingford; Mario Pasquini, Milford; William M. Schreyer, Monroe, all of Conn.

[73] Assignee: Food Automation-Service Techniques, Inc., Stratford, Conn.

[21] Appl. No.: 33,097

[22] Filed: Mar. 31, 1987

[51] Int. Cl.⁴ .............................................. H05B 1/02
[52] U.S. Cl. ................................... 364/131; 219/492; 364/400
[58] Field of Search ........ 364/400, 477, 557, 131–139; 219/490, 492, 10.55 B, 10.55 E

[56] References Cited

U.S. PATENT DOCUMENTS

| | | | |
|---|---|---|---|
| 3,988,577 | 10/1976 | Leitner et al. | 364/138 |
| 4,131,786 | 12/1978 | Cooper | 219/10.55 B |
| 4,380,698 | 4/1983 | Butts | 364/477 X |
| 4,418,333 | 11/1983 | Schwarzbach et al. | 364/139 |
| 4,567,557 | 1/1986 | Burns | 364/138 |
| 4,601,004 | 7/1986 | Holt et al. | 364/400 X |
| 4,615,014 | 9/1986 | Gigandet et al. | 364/557 |
| 4,626,662 | 12/1986 | Woolf | 340/870.17 |
| 4,644,137 | 2/1987 | Asahi et al. | 364/187 X |
| 4,672,540 | 6/1987 | Waugh et al. | 364/400 |
| 4,703,306 | 10/1987 | Barritt | 340/825.22 |

*Primary Examiner*—Allen MacDonald
*Attorney, Agent, or Firm*—Felfe & Lynch

[57] ABSTRACT

A cooking computer communication system in which a control computer controls one or more cooking appliance computers. The control computer may, for example, be a local store computer or may be a remote corporate mainframe computer. The system also may include an interface microprocessor between the cooking appliance computer and the local computer and the control computer may include the interface processor. The local store computer or the remote computer may also act as a monitor computer.

12 Claims, 6 Drawing Sheets

PLURAL COOKING COMPUTER COMMUNICATION SYSTEM

This invention relates to a cooking computer communication system and, more particularly, to a cooking computer communication system in which a control computer is coupled to a cooking appliance computer for controlling the cooking appliance computer.

Heretofore, cooking appliance computers have been utilized individually with cooking appliances with each cooking appliance computer controlling its associated cooking appliance. In accordance with the present invention, a control computer is coupled to a cooking appliance computer for controlling the cooking appliance computer in setting the desired value of at least one parameter, for example, temperature, of a cooking appliance computer.

Also in accordance with the invention, a monitor computer may be coupled to the cooking appliance computer for monitoring the cooking appliance computer in setting the desired value.

In a kitchen which has a plurality of cooking appliance computers a control computer can control locally or remotely the individual cooking appliance computers in accordance with the invention.

In accordance with the invention, the control computer can control individually, for example, the temperatures of individual cooking appliance computers, record the inventories for the individual cooking appliances, monitor the operations of the individual cooking appliances, give and receive messages to and from the individual cooking appliance computers, and the individual cooking appliance computers can communicate with each other.

It is an object of the present invention, therefore, to provide a new and improved cooking computer communication system which avoids one or more of the disadvantages of prior cooking computer systems.

It is another object of the invention to provide a new and improved cooking computer communication system which controls one or more parameters of one or more cooking appliance computers remotely or locally or both.

It is another object of the invention to provide a new and improved cooking computer communication system which monitors one or more cooking appliance computers in setting a desired value of one or more parameters thereof.

It is another object of the invention to provide a new and improved cooking computer communication system by which the manager of a store having several cooking appliance computers therein can locally control one or more cooking appliance computers by setting a desired value of at least one parameter thereof or can monitor the operation of the cooking appliance computers or both.

It is another object of the invention to provide a new and improved cooking computer communication system by which a corporate manager remote from the location of cooking appliance computers can control or monitor the operation of one or more cooking appliance computers or both.

It is another object of the invention to provide a new and improved cooking computer communication system in which the cooking computers can communicate with each other.

In accordance with the invention, a cooking computer communication system comprises a cooking appliance computer for setting a desired value of at least one parameter of a cooking computer. The system also comprises a control computer coupled to the cooking appliance computer for controlling the cooking appliance computer in setting the desired value.

Also in accordance with the invention, a cooking computer communication system comprises a cooking appliance computer for setting a desired value of at least one parameter of a cooking computer. The system also comprises a monitor computer coupled to the cooking appliance computer for monitoring the cooking appliance computer in setting the desired value.

Also in accordance with the invention, a cooking computer communication system comprises a first cooking appliance computer for setting a desired value of at least one parameter of a cooking unit and a second cooking appliance computer for setting a desired value of at least one parameter of a second cooking unit. The system also includes means for sensing the actual value of the parameter of the second cooking unit. The system also includes a control computer coupled to the first and second cooking appliance units and responsive to a first inquiry from the first cooking appliance computer as to whether the control computer has a message to transmit to the second cooking appliance computer for transmitting a message to the second cooking appliance computer. The second cooking appliance computer is coupled to the first cooking appliance computer and is responsive to an inquiry therefrom as to whether the second cooking appliance computer has a message to transmit to the control computer for transmitting to the control computer a message representing the actual value of the parameter of a second cooking unit. The control computer is responsive to a second inquiry from the first cooking appliance computer for transmitting to the second cooking appliance computer a second message relating to setting a desired value of the aforesaid parameter of the second cooking unit.

For a better understanding of the present invention, together with other and further objects thereof, reference is made to the following description, taken in connection with the accompanying drawings, and its scope will be pointed out in the appended claims.

Referring now to the drawings.

Figure 5:
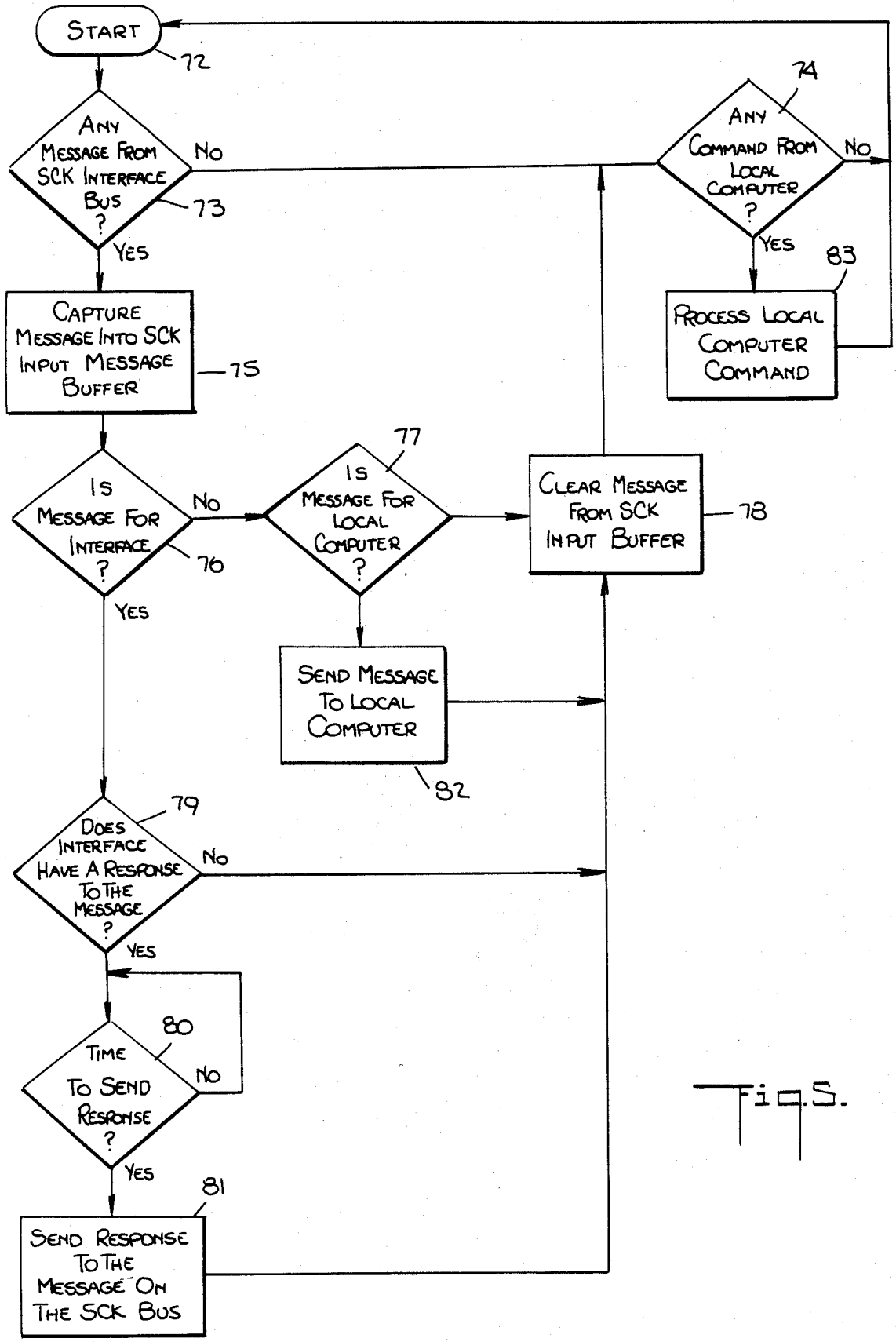
Figure 6:
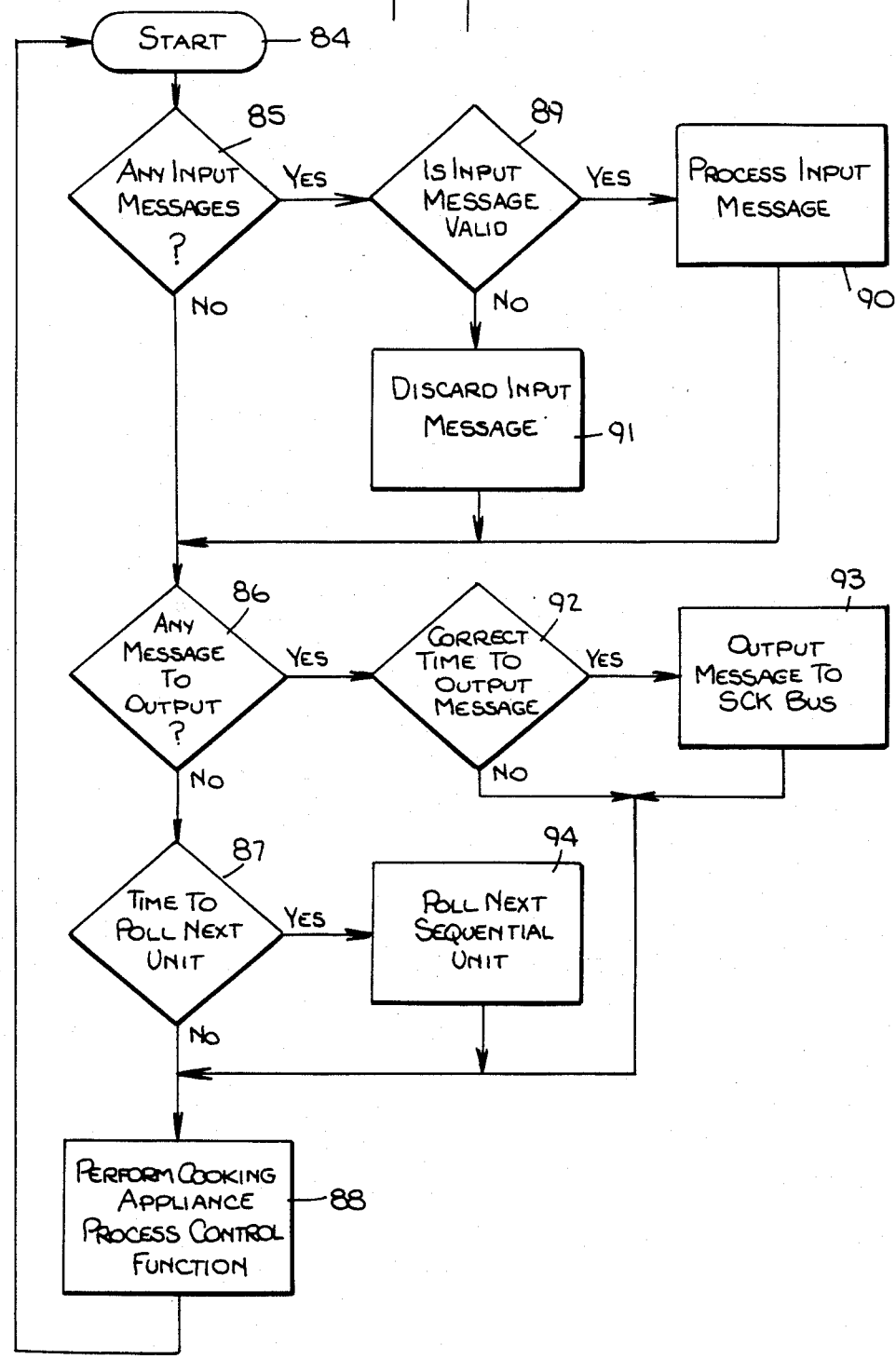

FIG. 5 is a flow-chart comprising a schematic representation of a portion of an interface microprocessor which operates according to a computer program produced according to the flow-chart; and FIG. 6 is a flow-chart comprising a schematic representation of a portion of a cooking appliance computer which serves as a master unit which operates according to a computer program produced according to the flow-chart.

Before referring to the drawings in detail, it will be understood that for purposes of clarity, the apparatus represented in the block diagrams of FIGS. 2 to 6, inclusive, utilize, for example, individually an analog to digital converter and a microprocessor which includes such hardware as a central processing unit, program and random access memories, timing and control circuitry, input-output interface devices and other digital subsystems necessary to the operation of each central processing unit as is well understood by those skilled in the art. Each microprocessor operates according to the corresponding computer program produced according to the corresponding flow-chart represented in the drawings.

Figure 1:
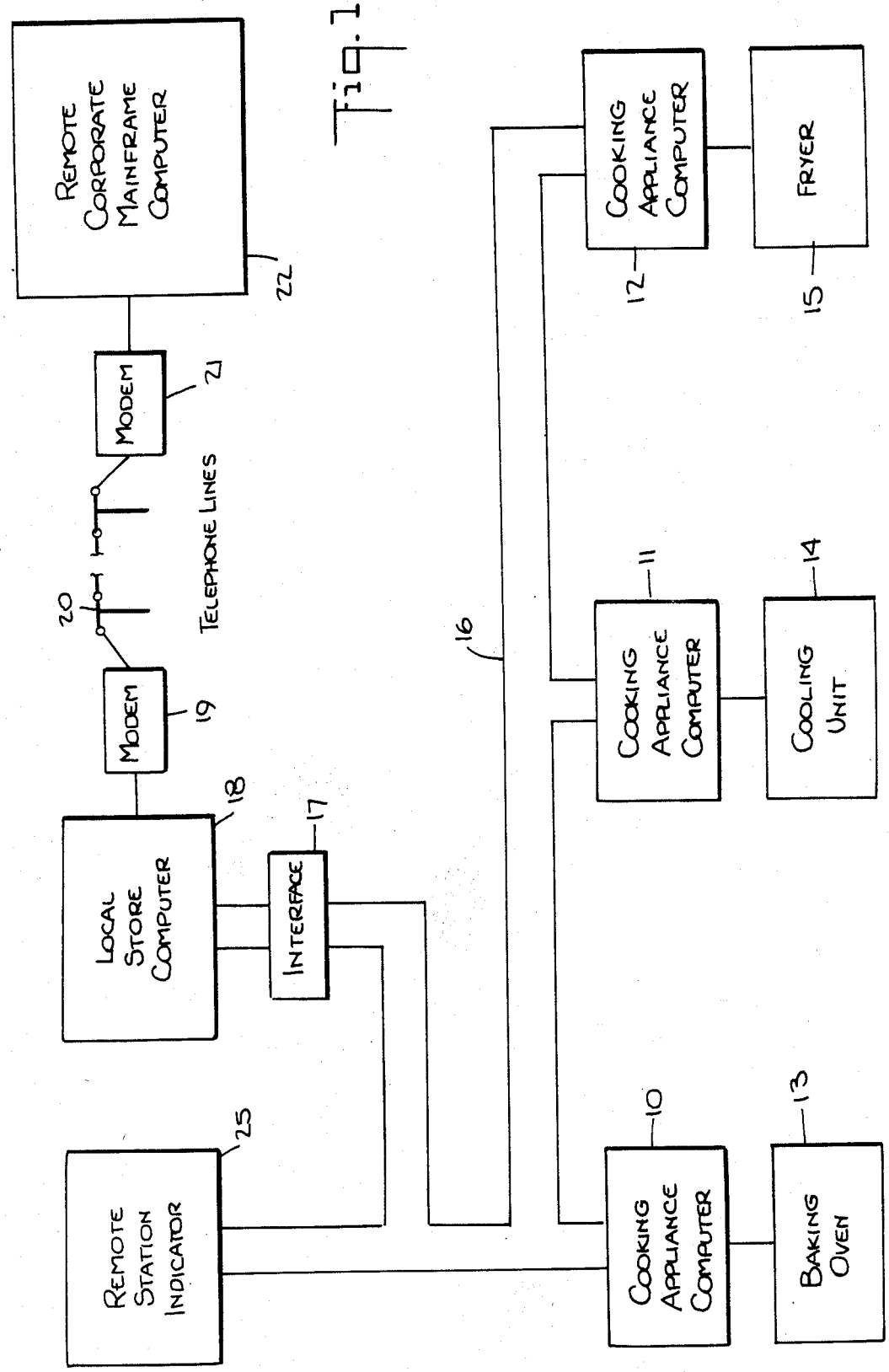
FIG. 1 is a schematic diagram of a cooking computer communication system constructed in accordance with the invention and the cooking appliances controlled thereby.

Referring now more particularly to FIG. 1 of the drawings, a local food store may include, for example, cooking appliance computers 10, 11, and 12, for controlling one or more parameters, for example, the temperature, of the cooking appliances associated therewith. For the purposes of this specification and claims, the term "cooking unit" or "cooking appliance" shall be understood to include a temperature-control unit which may, for example, be a cooling unit.

The cooking appliance computers 10, 11, 12 may, for example, be of a type used in apparatus described and claimed in copending applications Ser. No. 840,362, filed Mar. 17, 1986, and in Ser. No. 943,949, filed Dec. 18, 1986, and in Ser. No. 937,988, filed Dec. 4, 1986, and in Ser. No. 934,700, filed Nov. 25, 1986, and in Ser. No. 911,480, filed Sept. 25, 1986.

A cooking computer communication system in accordance with the invention comprises a cooking appliance computer for setting a desired value of at least one parameter of a cooking computer. This cooking appliance computer may, for example, be any of the computers 10, 11 and 12 coupled to a baking oven 13, a cooling unit 14 and a fryer 15, respectively, for setting a desired value of at least one parameter of a cooking computer. In this connection, the computer 11 shall be understood to be a cooking appliance computer, for example, a temperature-control computer for setting the temperature of the cooling unit 14 utilized in the cooking system.

The cooking appliance computers 10, 11 and 12 are interconnected by a communication bus 16 to an interface 17. The interface 17 couples the bus 16 to a local (e.g., store) computer 18 which, in turn, is coupled to a suitable modem 19 comprising a telephone. The modem 19 may be of any suitable type, for example, Hayes Model 07-00038. The telephone of the modem 19 is connected by telephone lines 20 to a remote modem 21 including a telephone and similar to the modem 19. The cooking appliance computers 10, 11 and 12 may also be connected by the communication bus 16 to one or more remote status indicators 25 which preferably are of a type described and claimed in copending application Ser. No. 911,480, filed Sept. 25, 1986. The local store computer may be a personal computer of any well-known type and may serve as a control computer coupled to the cooking appliance computer for controlling the cooking appliance computer in setting the desired value of at least one parameter of the cooking computer. The remote modem 21 is coupled to a remote computer, which may, for example, be a remote corporate mainframe computer 22.

As will be apparent hereinafter, the remote corporate mainframe computer, the local store computer, the interface, or any of the cooking appliance computers can serve as the control computer. The control computer may be the local cooking computer 18 and the remote control computer may also be coupled to the local control cooking computer 18 for controlling the local control cooking computer 18 for controlling the cooking appliance computer 10, 11 or 12 and for setting the desired value of at least one parameter thereof. The control computer can send messages and receive messages from the cooking appliance computers. The cooking computer communication system comprises a cooking appliance computer for setting a desired value of at least one parameter, for example, temperature, of a cooking computer 10, 11 or 12. The cooking computer communication system also comprises a monitor computer coupled to the cooking appliance computer for monitoring the cooking appliance computer in setting the desired value. The monitor computer may be, for example, the local store computer 18 or the corporate remote mainframe computer 22. The monitor computer may be, for example, the local cooking computer 18 and the communication system may include a remote monitor cooking computer 22 coupled to the local monitor cooking computer for monitoring the local monitor cooking computer for monitoring the cooking appliance computer in setting the desired value. The remote control cooking computer may also be coupled to the local control cooking computer for controlling the local control cooking computer for controlling the cooking appliance computer in setting the desired value.

The cooking computer communication system comprises a first cooking appliance computer 10 for setting a desired value of at least one parameter, for example, temperature, of a cooking unit. The system also includes a second cooking appliance computer 11 for setting a desired value of at least one parameter, for example, temperature, of a second cooking unit. The system also includes means for sensing the actual value of the parameter of the second cooking unit.

The system also includes a control computer 18 coupled to the first and second cooking appliance computers and responsive to a first inquiry from the first cooking appliance computer as to whether the control computer 18 has a message to transmit to the second cooking appliance computer 11 for transmitting a message to the second cooking appliance computer 11.

The second cooking appliance computer 11 is coupled to the first cooking appliance computer 10 and is responsive to an inquiry therefrom as to whether the second cooking appliance computer has a message to transmit to the control computer for transmitting to the control computer 22 a message representing the actual value of the parameter of the second cooking unit. The control computer 22 is responsive to a second inquiry from the first cooking appliance computer for transmitting to the second cooking appliance computer 11 a second message relating to setting a desired value of the parameter of the second unit.

Figure 2:
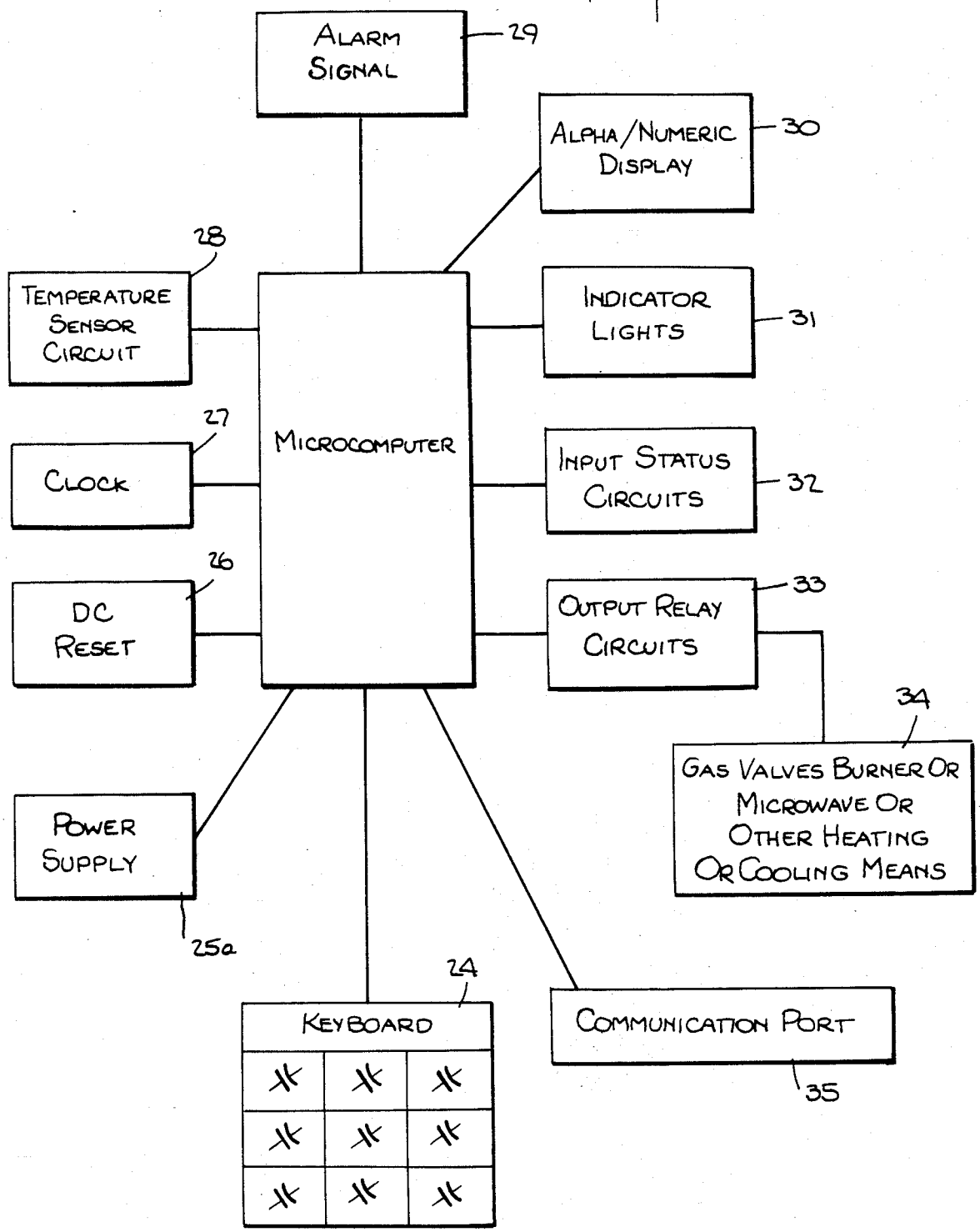
FIG. 2 is a schematic diagram representing apparatus including a microcomputer and usable in the FIG. 1 cooking computer communication system.

Referring now more particularly to FIG. 2 of the drawings, a microcomputer 23 includes a central processing unit which receives an input from the keyboard 24 which may, for example, comprise a capacitive keyboard.

The apparatus includes a conventional power supply 25a, a reset circuit 26 for resetting the microcomputer when renewing power in the power supply, a clock oscillator 27 for providing clock pulses to the microcomputer 23, a temperature sensor circuit 28 for sensing the temperature within the cooking apparatus, an audible alarm 29, an alpha-numeric display 30 and indicator lights 31. The apparatus also includes an input status circuit 32 which may, for example, be responsive to a door switch (not shown) and to the open/close position of the drain valve (not shown). The microcomputer controls an output relay circuit 33 which may, for example, control the gas valves of a burner or a heating element or microwave or other heating means or cooling means. The apparatus also includes a communication port 35 for transmitting signals to and from other apparatus.

Figure 3:
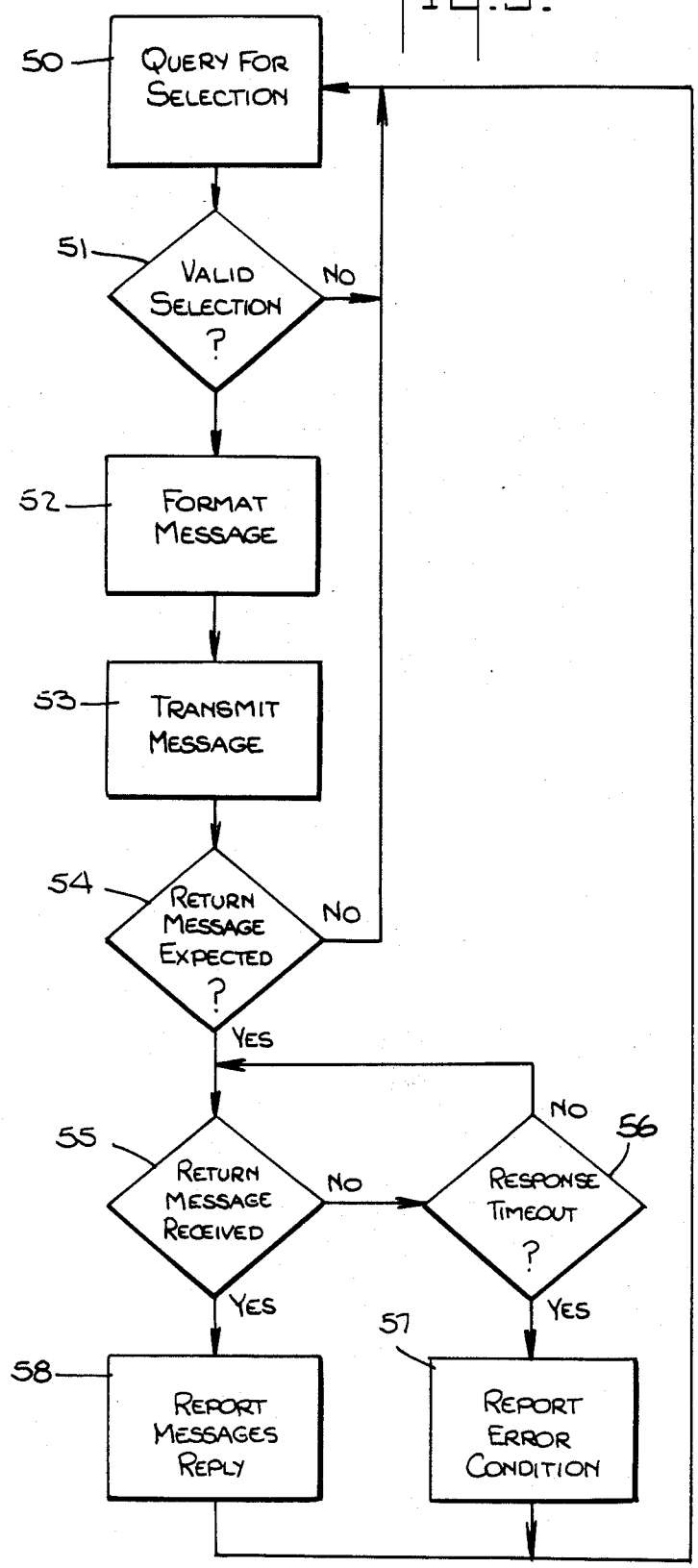
FIG. 3 is a flow-chart comprising a schematic representation of a portion of a remote microcomputer which operates according to a computer program produced according to the flow-chart.

Referring now to FIGS. 1 and 3, there is represented in FIG. 3 a flow chart for the remote computer 22. The remote computer 22 is programmed in accordance with the FIG. 3 flow chart. The programmed remote computer has a "query for selection" microprocessor portion 50 which may, for example, watt for a query selection by an operator at the remote computer. One of the selection possibilities is to query a cooking appliance computer's set temperature. The "query for selection" microprocessor portion 50 applies the query selection to a "valid selection?" microprocessor portion 51. If the selection is an invalid selection, the "no" output of the microprocessor portion 51 applies a signal to the microprocessor portion 50. Valid selections may be, for example, "query set temperature", "query cook time", "query inventory", or "perform maintenance and operational tests" or "program a new cook time" or "program a new set temperature".

If the microprocessor portion 51 determines that the query selection is a valid selection, the "yes" output of the microprocessor portion 51 applies a signal to the "format message" microprocessor portion 52. The microprocessor portion 52 then formats a message which may be a function code which is a unique number meaning, for example, "read cook temperature". The microprocessor portion 52 applies the formatted message to a "transmit message" microprocessor portion 53 which is coupled through the modem 21 of FIG. 1 to the telephone lines 20. The microprocessor portion 53 also applies a signal to a "return message expected?" microprocessor portion 54.

If no return message is expected, the "no" output of the microprocessor portion 54 applies a signal to the "query for selection" microprocessor portion 50 which then is in control.

If a return message is expected, the "yes" output of the microprocessor portion 54 applies a signal to a "return message received" microprocessor portion 55. The "return message received" microprocessor portion 55 waits for the return message while the "no" output of the microprocessor portion 55 is coupled to a "response time out?" microprocessor portion 56 which performs a time out sequence. The "no" output of the microprocessor portion 56 is coupled to the input of the microprocessor portion 55. The "yes" output of the microprocessor portion 56 is coupled to a "report error condition" microprocessor portion 57. The microprocessor portion 57 is coupled to the "query for selection" microprocessor portion 50 which again becomes in control.

If a response is received before the microprocessor portion 56 times out, the "yes" output of the microprocessor portion 55 is coupled to a "report messages reply" microprocessor portion 58 which relays the reply to the remote computer console or display (not shown). Thus, if a response does not arrive within a reasonable time an error condition is reported to the microprocessor portion 50 or if a response is received in the predetermined reasonable time, the control returns to the microprocessor portion 50 which waits for a new selection.

Figure 4:
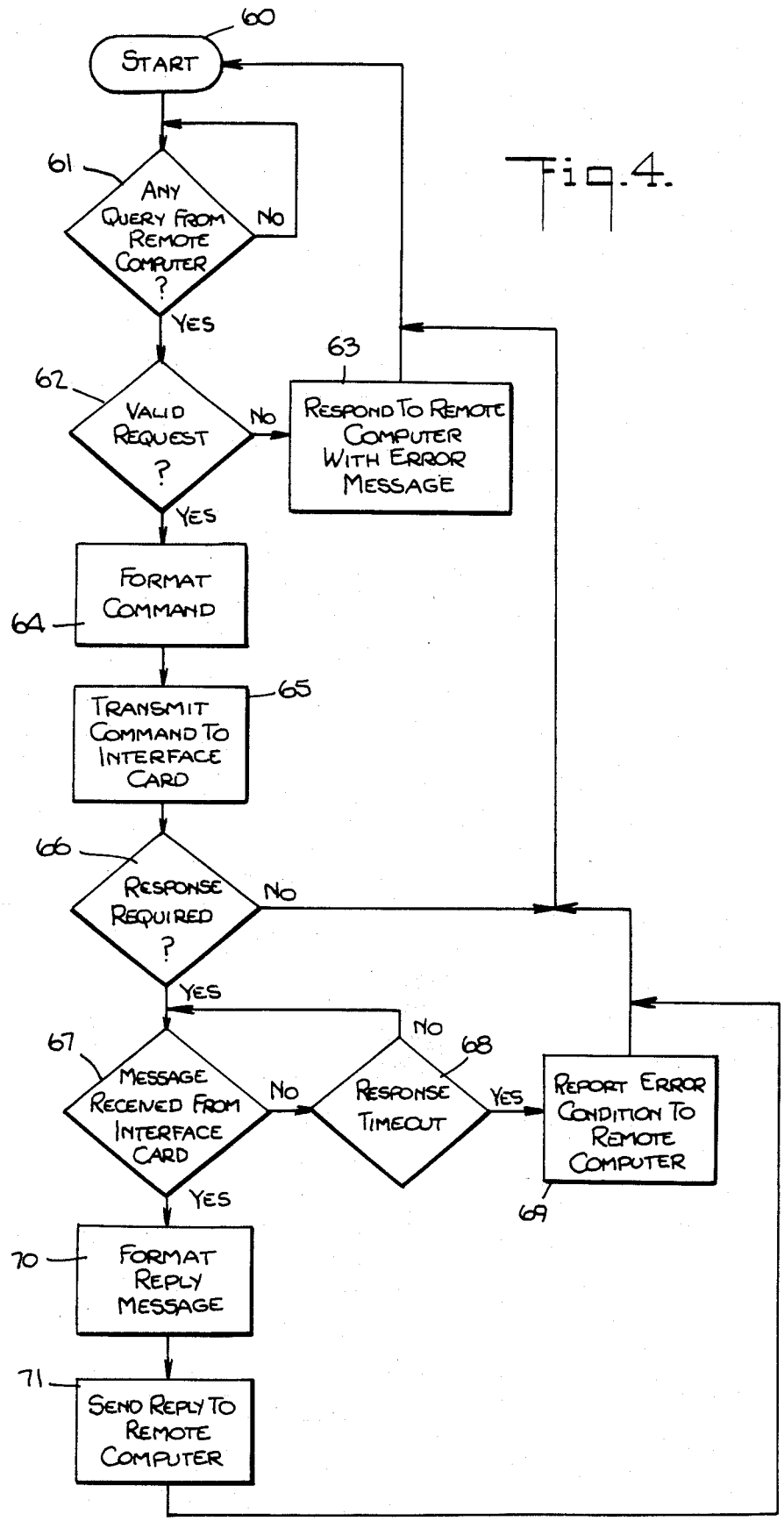
FIG. 4 is a flow-chart comprising a schematic representation of a portion of a local microcomputer which operates according to a computer program produced according to the flow-chart.

Referring now more particularly to FIGS. 1 and 4, the local computer 18 which may be under the control of a store manager is programmed in accordance with the flow chart represented in FIG. 4. Power may be applied to the local computer by depressing a suitable key of a "start" microprocessor portion 60. The local computer then automatically enters an idle loop utilizing an "any query from remote computer?" microprocessor portion 61 having a "no" output coupled to the input of the microprocessor portion 61. The microprocessor portion 61 awaits a telephone call from the remote corporate mainframe computer.

The "yes" output of the microprocessor portion 61 is coupled to a "valid request?" microprocessor portion 62 for testing the validity of any message received. The "no" output of the microprocessor portion 62 is coupled to a "respond to remote computer with error message" microprocessor portion 63. The microprocessor portion 63 is coupled to the "start" portion 60 to return control to the "start" portion.

The "yes" output of the microprocessor portion 62 is coupled to a "format command" microprocessor portion 64 which is, for example, for formatting a command for the Smart Commercial Kitchen bus 16. The valid message command is transmitted by the microprocessor portion 64 to a "transmit command to interface card" microprocessor portion 65. As will be more fully described subsequently, the interface card includes an interface microprocessor between the local computer and the smart commercial kitchen bus 16 as represented by interface 17 of FIG. 1. Based upon the content of the message, the local computer either waits for another query from the remote computer 22 or enters a timed wait loop utilizing a "message received from interface card" microprocessor portion 67 having a "no" output coupled to a "response time out?" microprocessor portion 68 having its "no" output coupled to the input of microprocessor portion 67.

The output of the microprocessor portion 65 is coupled to a "response required" microprocessor portion 66 having a "no" output coupled to the start portion 60 to return control thereto which awaits another query from the remote computer. The "yes" output of the microprocessor portion 66 is coupled to the microprocessor portion 67 described above.

If the microprocessor portion 68 times out before a response is received from the interface card 17, the "yes" output of the microprocessor portion 68 is coupled to a "report error condition to remote computer" microprocessor portion 69 which is, in turn, coupled to the portion 60 to await another query from the remote computer and control returns to the "start" portion 60 of the main control loop.

If a message is received by the microprocessor portion 67 within the predetermined time period, the "yes" output of the microprocessor portion 67 is coupled to a "format reply message" microprocessor portion 70 which formats a reply message for the remote computer. The microprocessor portion 70 is coupled to a "send reply to remote computer" microprocessor portion 71 which is also coupled to the "start" portion 60 of the local computer. After transmitting the reply message, the local computer then returns to its idle loop 60, 61.

Referring now more particularly to FIG. 5 of the drawings, the flow chart of the programmed interface 17 is there represented. A "start" microprocessor portion 72 is actuated upon reset of the interface 17. The "start" microprocessor portion 72 is coupled to a "any message from SCK interface bus?" microprocessor portion 73. The "no" output of the microprocessor portion 73 is coupled to an "any command from local computer?" microprocessor portion 74. The "no" output of the microprocessor portion 74 is coupled to the "start" microprocessor portion 72, causing the microprocessor to remain in its idle loop 72, 73, 74, waiting for one of two events to occur. One event is a message from the Smart Commercial Kitchen (SCK interface bus 16 and the other event is a command from the local computer 18. The occurrence of each event will be described separately hereinafter.

A message from the SCK interface bus 16 may be identified by an interrupt signal. When a message is received from the SCK interface bus 16, the "yes" output of the microprocessor portion 73 causes the "capture message into SCK input message buffer" microprocessor portion 75 and then it is analyzed. The microprocessor portion 75 is coupled to a "is message for interface?" microprocessor portion 76. The "no" output of the microprocessor portion 76 is coupled to a "is message for local computer?" microprocessor portion 77. The "no" output of the microprocessor portion 77 is coupled to a "clear message from SCK input buffer" microprocessor portion 78 which is coupled to the idle loop 72, 73, 74.

A message for the interface 17 is typically a request for a message, although it may be other messages sent on a global basis. The SCK interface microprocessor portion 76 has its "yes" output coupled to a "does interface have a response to the message?" microprocessor portion 79.

As will be described subsequently, the Smart Commercial Kitchen (SCK) master polls the interface 17 and the cooking appliance computers to put an output message onto the SCK bus 16. The SCK interface microprocessor 17 determines whether a response to the SCK bus query is available. If no output message to the SCK bus is waiting, then the microprocessor portion 79 has its "no" output coupled to the microprocessor portion 78 and the idle loop continues.

When a response is waiting to be applied as an SCK bus message, the "yes" output of the microprocessor portion 79 is coupled to a "time to send response?" microprocessor portion 80.

The "no" output of the microprocessor portion 80 is applied to the input of the microprocessor portion 80. The "yes" output of the microprocessor portion 80 is coupled to a "send response to the message on the SCK bus" microprocessor portion 81. After the response has been sent the microprocessor portion 81 actuates the "clear message from SCK input buffer" microprocessor portion 78. The idle loop 72, 73, 74 then continues.

When the message on the SCK bus 16 is not for the interface 17 directly, the microprocessor portions 76 and 77 analyze the message and the "yes" output of the microprocessor portion 77 is coupled to a "send message to local computer" microprocessor portion 82. The local computer can issue a "pass function code" to the microprocessor portion 82, causing the microprocessor portion 82 to pass messages to the local computer 18 from the SCK bus 16 that have the particular "pass function code". If it is determined that the message is for the local computer 18, the microprocessor portion 82 sends the message to the local computer 18 via appropriate handshaking procedures. By handshaking procedures is meant bi-directional communication to establish to each processor the presence of the other processor and that it is in a ready state. Each processor responds to the other processor's signal with its own signal for which the first processor is waiting. The input message is then cleared by the microprocessor portion 78 from the SCK input buffer and the idle loop 72, 73, 74 continues.

The interface microprocessor may also be interrupted by the local computer 18. Commands from the local computer 18 are recognized by microprocessor portion 74 and the "yes" output of the microprocessor portion 74 is coupled to a "process local computer command" microprocessor portion 83 which is coupled to the start portion 72 as part of the main idle loop. Commands from the local computer 18 to the microprocessor of the interface 17 may, for example, be: "reset buffers", "next data word is device code", "buffer data from local computer to SCK bus output buffer". Diagnostic may also be initiated by local computer commands. Upon completion of processing the local computer command, the interface microprocessor returns to its main idle loop.

The local computer can change the type of message the interface 17 is seeking. The local computer is reprogrammable at its store location and can change the characteristics of the "process local computer command" microprocessor portion 83.

Referring now to FIG. 6 of the drawings, there is represented a flow chart for a cooking appliance computer master unit programmed in accordance with the flow chart. The cooking appliance computer slave units may be programmed in accordance with the same flow chart with the omission of the "time to poll next unit?" microprocessor portion and the "poll next sequential unit" microprocessor portion to be described subsequently. The flow chart represents a polling system of implementation although token ring or other communication bus architectures would equally suffice. A "start" microprocessor portion 84 is coupled to an "any input messages?" microprocessor portion 85. The "no" output of the microprocessor portion 85 is coupled to a "any message to output?" microprocessor portion 86. The "no" output of the microprocessor portion 86 is coupled to a "time to poll next unit?" microprocessor portion 87. The "no" output of the microprocessor portion 87 is coupled to a "perform cooking appliance process control function" microprocessor portion 88. The cooking appliance process control function performed may, for example, be to reset the set temperature as described, for example, in Ser. No. 840,362, filed Mar. 17, 1986. The microprocessor portion 88 is then coupled to the "start" microprocessor portion 84 to form the main idle loop. In checking for input messages from the SCK communication bus 16, the "yes" output of the microprocessor portion 85 is coupled to an "is input message valid?" microprocessor portion 89. The validity of the message may be determined in any suitable manner, for example, by a check sum, unit number, or function code. A valid message would, for example, be a query for the current cooking appliance temperature. If the message is invalid, the "no" output of the microprocessor portion 89 is coupled to a "discard input message" microprocessor portion 91 which discards the input message and is coupled to the microprocessor portion 86. A message may be considered invalid if it has, for example, an incorrect check sum or if the destination unit number in the message does not match the unit that has received the message. The "yes" output of the microprocessor portion 89 is coupled to a "process input message" microprocessor portion 90 which may then have an output message and is coupled to the microprocessor portion 86. The output message may, for example, be the cooking appliance temperature.

When no input messages are present on the SCK communication bus 16, the microprocessor portion 86 then checks to determine whether there is any message to output onto the SCK communication bus 16. When there is a message waiting for outputting, the cooking appliance computer master must wait for the appropriate time before the output message is sent. Cooking appliance computers other than the master only assert their messages when they are polled. The master asserts its message at timed intervals. The "yes" output of the microprocessor portion 86 is coupled to a "correct time to output message?" microprocessor portion 92. The "yes" output of the microprocessor portion 92 is coupled to an "output message onto SCK bus" microprocessor portion 93. The microprocessor portion 93 and the "no" output of the microprocessor portion 92 are coupled to the microprocessor portion 88. Thus, if it was not the correct time to transmit the message or if a message was transmitted, then control is passed to the microprocessor portion 88 which performs the cooking appliance process control function. The master omits sending the polling message to the slaves when it transmits any information over the SCK bus 16.

When there are no input messages and no waiting or pending output messages, the master cooking appliance computer checks to determine whether it is time to poll the next unit by means of the master microprocessor portion 87 having its "yes" output connected to a "poll next sequential unit" microprocessor portion 94.

When it is the correct time to poll the other units, the master unit issues a polling message onto the SCK communication bus 16 by means of microprocessor portion 94. All units on the bus 16 are ready to accept the transmission. Units other than the master will not perform the polling function as described in connection with microprocessor portions 87 and 94.

The microprocessor portion 94 is coupled to the microprocessor portion 88 so that upon completing the polling function, the master cooking appliance computer unit will proceed to perform the cooking appliance process control function.

The cooking appliance process control function is performed by all cooking appliance computers coupled to the SCK bus 16 continuously, in addition to the communication functions described herein with respect to the master.

From the foregoing description it will be apparent that the communication system is capable of controlling cooking appliance computers, for example, from a local store computer or from a remote corporate mainframe computer. The cooking appliance computers can be controlled to receive messages from the local computer or the remote computer or from one another and to transmit messages to the local computer and to the remote computer and to one another. The cooking appliance computers can also transmit messages to the remote status indicator 25 in the manner described in copending application Ser. No. 911,480, filed Sept. 25, 1986. The communication system may handle a variety of messages including messages relating to inventory control and load level for the individual cooking appliance computers. Additional messages such as commands to start and terminate the cooking appliance computers and the local computer and to turn off any or all power supplies in the store can be issued from the remote computer.

The apparatus may include a bar coding system in which the bar code is read by a conventional reader and represents a product identification. The product identification may be utilized by the control computer to set the desired value of at least one parameter of the cooking appliance computer. The bar code may also be utilized by the control computer for inventory control.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A cooking computer communication system comprising:
    at least two cooking appliance computer means for setting a desired value of at least one parameter of at least two cooking appliances and for sending messages;
    a bi-directional bus coupled to said computer means; and
    a control computer means coupled through said bus to said at least two cooking appliance computer means for receiving messages therefrom and for sending messages through said bus for controlling said cooking appliance computer means in setting said desired value;
    each of said at least two cooking appliance computer means comprising means for bi-directionally communicating with said control computer means, and comprising means for bi-directionally communicating with another of said at least two cooking appliance computer means, for receiving messages and for sending messages.

2. A cooking computer communication system in accordance with claim 1, in which said control computer means is a local control cooking computer means and which system includes a remote control cooking computer means coupled to said local control cooking computer means for controlling said local control cooking computer means for controlling said cooking appliance computer means in setting said desired value.

3. A system in accordance with claim 1, in which said control computer means is a temperature control appliance computer.

4. A system in accordance with claim 1, in which said control computer means is a cooking computer.

5. A system in accordance with claim 1, in which said control computer means is a local computer.

6. A system in accordance with claim 1, in which said control computer means is a remote computer.

7. A system in accordance with claim 1, which includes a local computer and which also includes interface processor means between said cooking appliance computer means and said local computer and in which said control computer means comprises said interface processor means.

8. A cooking computer communication system comprising:
- a cooking appliance computer means for setting a desired value of at least one parameter of a cooking appliance and for sending messages;
- a bi-directional bus coupled to said computer means;
- a control computer means coupled through said bus to said cooking appliance computer means for receiving messages therefrom and for sending messages through said bus for controlling said cooking appliance computer means in setting said desired value, said control computer means being a second cooking appliance computer means.

9. A cooking computer communication system comprising:
- a first cooking appliance computer means for setting a desired value of at least one parameter of a cooking unit;
- a second cooking appliance computer means for setting a desired value of at least one parameter of a second cooking unit;
- means for sensing the actual value of the parameter of said second cooking unit;
- a control computer means coupled to said first and second cooking appliance computer means and responsive to a first inquiry from said first cooking appliance computer means as to whether said control computer means has a message to transmit to said second cooking appliance computer means for transmitting a message to said second cooking appliance computer means;
- said second cooking appliance computer means being coupled to said first cooking appliance computer means and responsive to an inquiry from said first cooking appliance computer means as to whether said second cooking appliance computer means has a message to transmit to said control computer means for transmitting to said control computer means a message representing said actual value of said parameter of said second cooking unit;
- said control computer means being responsive to a second inquiry from said first cooking appliance computer means for transmitting to said second cooking appliance computer means a second message relating to setting a desired value of said parameter of said second cooking unit.

10. A cooking computer communication system in accordance with claim 1 in which said control computer means is:
- a monitor computer means coupled to said cooking appliance computer means for monitoring said cooking appliance computer means in setting said desired value.

11. A cooking computer communication system in accordance with claim 10, in which said monitor cooking computer means is a local cooking computer means and which system includes a remote cooking computer means coupled to said local monitor cooking computer means for monitoring said cooking appliance computer means in setting said desired value.

12. A cooking computer communication system in accordance with claim 10, in which said control computer means is a local cooking computer means and which system includes a remote control cooking computer means coupled to said local control cooking computer means for controlling said local control cooking computer means for controlling said cooking appliance computer means in setting said desired vale.

* * * * *